United States Patent
Bateni et al.

(10) Patent No.: US 7,783,648 B2
(45) Date of Patent: Aug. 24, 2010

(54) METHODS AND SYSTEMS FOR PARTITIONING DATASETS

(75) Inventors: Arash Bateni, Toronto (CA); Edward Kim, Toronto (CA); Prathayana Balendran, Scarborough (CA); Andrew Chan, Mississauga (CA)

(73) Assignee: Teradata US, Inc., Miamisburg, OH (US)

( * ) Notice: Subject to any disclaimer, the term of this patent is extended or adjusted under 35 U.S.C. 154(b) by 231 days.

(21) Appl. No.: 11/772,343

(22) Filed: Jul. 2, 2007

(65) Prior Publication Data
US 2009/0012979 A1   Jan. 8, 2009

(51) Int. Cl.
*G06F 17/30* (2006.01)
(52) U.S. Cl. .................. 707/752; 707/803; 707/972
(58) Field of Classification Search .............. 707/1, 707/3, 6, 10, 100, 200, 2, 7, 101, 102, 752, 707/803, 972
See application file for complete search history.

(56) References Cited

U.S. PATENT DOCUMENTS

| 7,039,638 B2 * | 5/2006 | Zhang et al. ......... 707/999.007 |
| 7,152,022 B1 * | 12/2006 | Joshi .......................... 703/2 |
| 7,441,186 B2 * | 10/2008 | Kasperkiewicz et al. .... 707/100 |

* cited by examiner

*Primary Examiner*—Marc R Filipczyk
(74) *Attorney, Agent, or Firm*—James Stover

(57) ABSTRACT

A partitioning system that provides a fast, simple and flexible method for partitioning a dataset. The process, executed within a computer system, retrieves product and sales data from a data store. Data items are selected and sorted by a data attribute of interest to a user and a distribution curve is determined for the selected data and data attribute. The total length of the distribution curve is calculated, and then the curve is divided into k equal pieces, where k is the number of the partitions. The selected data is thereafter partitioned into k groups corresponding to the curve divisions.

6 Claims, 11 Drawing Sheets

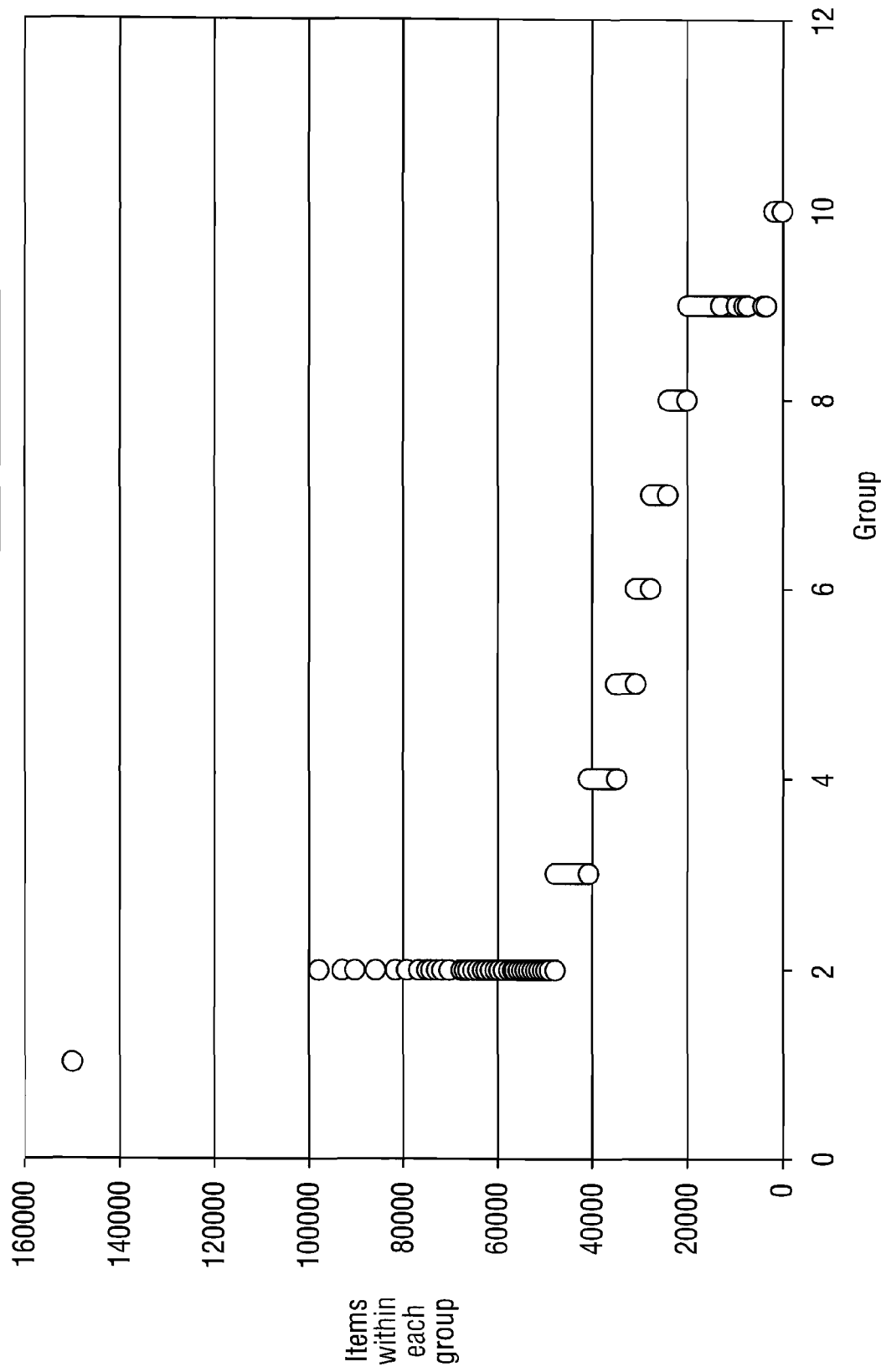

METHODS AND SYSTEMS FOR PARTITIONING DATASETS

FIELD OF THE INVENTION

The present invention relates to methods and systems for partitioning datasets for data analysis, and in particular, to the analysis of retail sales information for product forecasting and pricing, allocation, and inventory management determinations.

BACKGROUND OF THE INVENTION

Clustering is one of the most useful tasks in data mining applications for discovering groups and identifying interesting distributions and patterns in the underlying data. Clustering algorithms are utilized to partition a given dataset into groups, or clusters, such that the data points in a cluster are more similar to each other than points in different clusters. Partitioning a given dataset into several groups with similar attributes is of interest for various applications. In the retail environment, examples include partitioning a range of stores into groups with similar gross margin dollars, or grouping products based on their weekly sales. Partitioning datasets can simplify sales analysis and forecasting, particularly when data is missing or contains inaccuracies. It is often easier to obtain good forecasts for the aggregate sales from all items in a store or from all items in a product line than for each individual item in the store.

It is generally, desirable to form clusters of similar size containing items with similar attributes. Thus, the main concern in the clustering process is to reveal the organization of patterns into "sensible" groups, which allow the user to discover similarities and differences, as well as to derive useful conclusions about them.

Various clustering algorithms have been developed for partitioning datasets. However, these clustering algorithms typically require iterative optimization techniques. Consequently these algorithms tend to be computationally intensive, and their application not feasible for many practical cases, where suboptimal but fast algorithms are preferred.

BRIEF DESCRIPTION OF THE DRAWINGS

FIG. 2B is a histogram illustrating the grouping of items of FIG. 2A into groups with similar variation of item attribute value in accordance with an equal group-size strategy for partitioning a dataset.

DETAILED DESCRIPTION OF THE INVENTION

In the following description, reference is made to the accompanying drawings that form a part hereof and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

As stated earlier, various clustering algorithms have been developed for partitioning datasets. These clustering algorithms typically minimize the sum, over all clusters, of the within-cluster sums of point-to-cluster-centroid distances. These algorithms require iterative optimization techniques and consequently are often computationally expensive and their application is not feasible for many practical cases where suboptimal but fast algorithms are preferred.

Figure 1A:
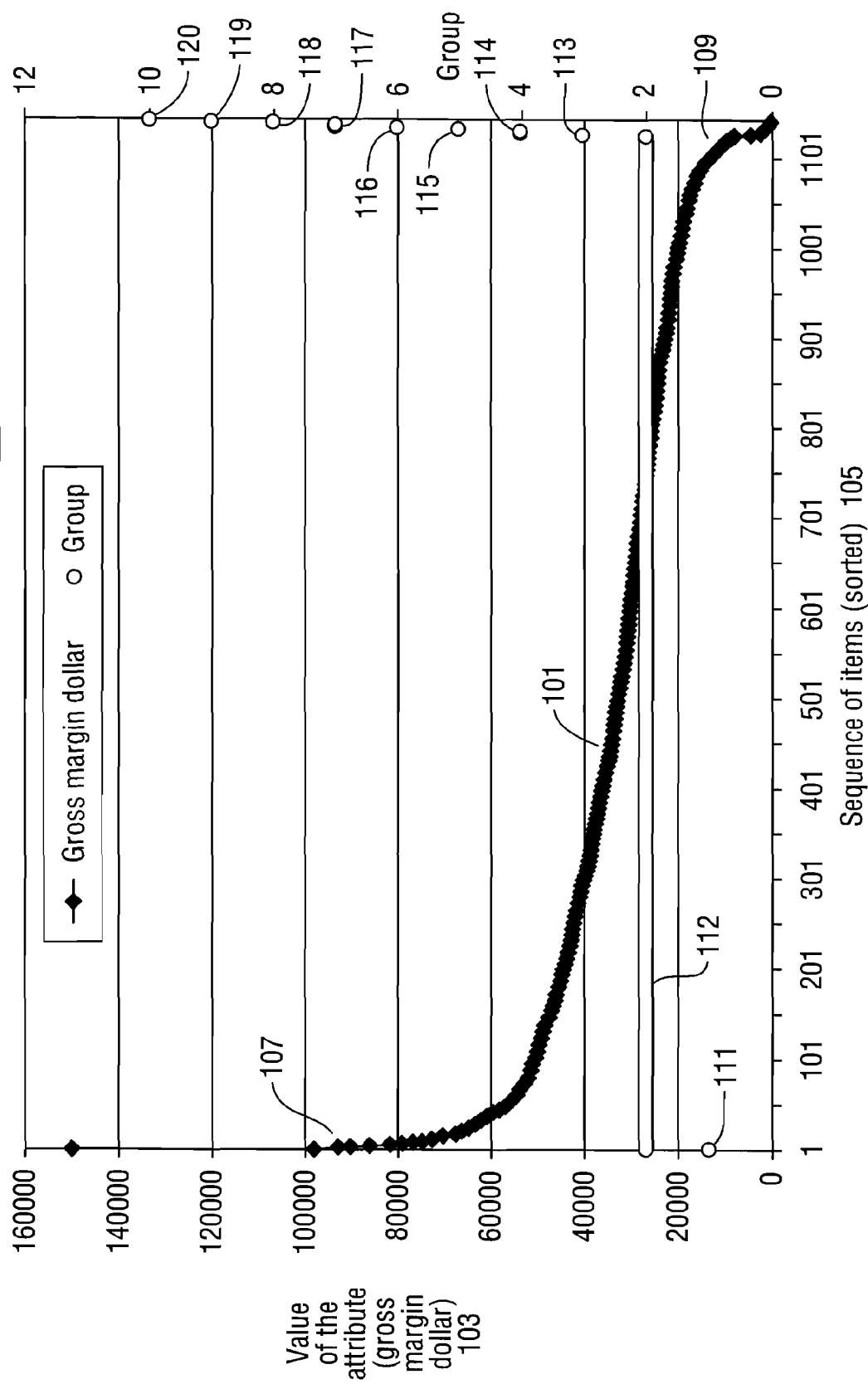
FIG. 1A is a graph illustrating the sorted distribution of an attribute value (gross margin dollars) among a plurality of items (retail stores) wherein the majority of the items have similar attribute values.
Figure 1B:
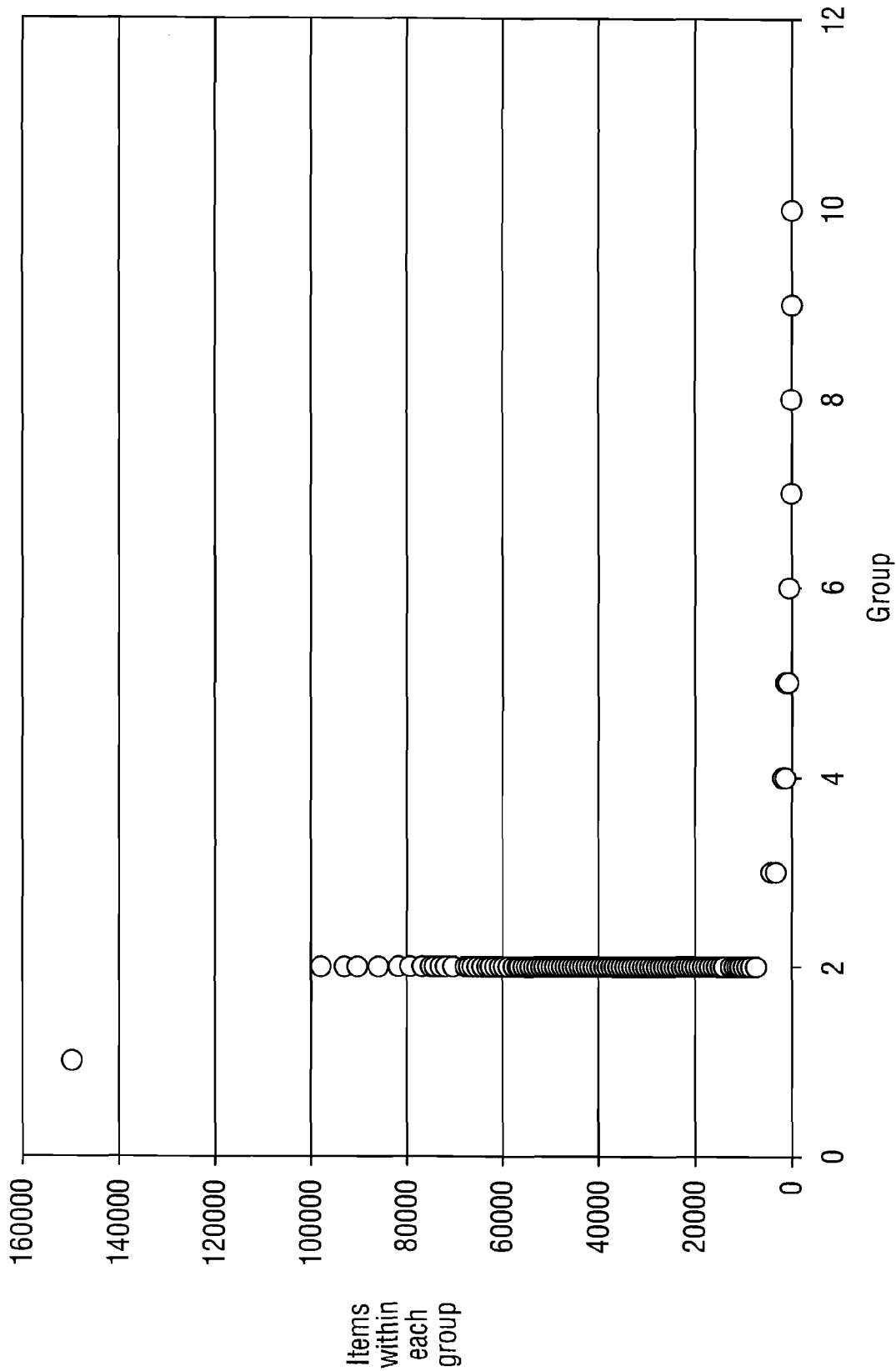
FIG. 1B is a histogram illustrating the grouping of items of FIG. 1A into groups with similar variation of item attribute value in accordance with a largest gap strategy for partitioning a dataset.

Intuitively, one may partition a sorted dataset by defining the cutting points at the largest gaps (highest jumps in the attribute). This strategy, referred to as the largest gap strategy, leads to groups with similar attributes; it may, however, result in groups of widely different sizes. For illustration, FIG. 1A shows the sorted distribution 101 of an attribute value (gross margin dollars) 103 among a plurality of items (retail stores) 105 wherein the majority of the items have similar attribute values. Employing the largest gap strategy to partition the data into ten groups leads to the results displayed in the histogram illustrated in FIG. 1B. Group ranges are also shown by groups segments 111 through 120 in FIG. 1A. About 98% of the stores are partitioned in one group, group 2, since the large gaps typically happen among the unusual stores at the two tails, 107 and 109, of data shown in FIG. 1.

A similar partitioning method, referred to as the equal range strategy, attempts to partition items into groups with similar range (similar variation of the attribute). This strategy often leads to the same shortcomings of the largest gap strategy shown in FIG. 1, since the items tend to have higher variation at the tails of the dataset (small groups) while they are more stable in the middle (large groups).

As described above, partitioning problems are often caused by the unusual items at the tails of the dataset, FIG. 1, curve segments 107 and 109, while the rest of the data often fall on a smooth curve 101. Utilizing an equal group-size strategy, illustrated in FIGS. 2A and 2B, the tails are first partitioned into two separate groups, and the remainder of the items is partitioned into groups of equal size.

Figure 2A:
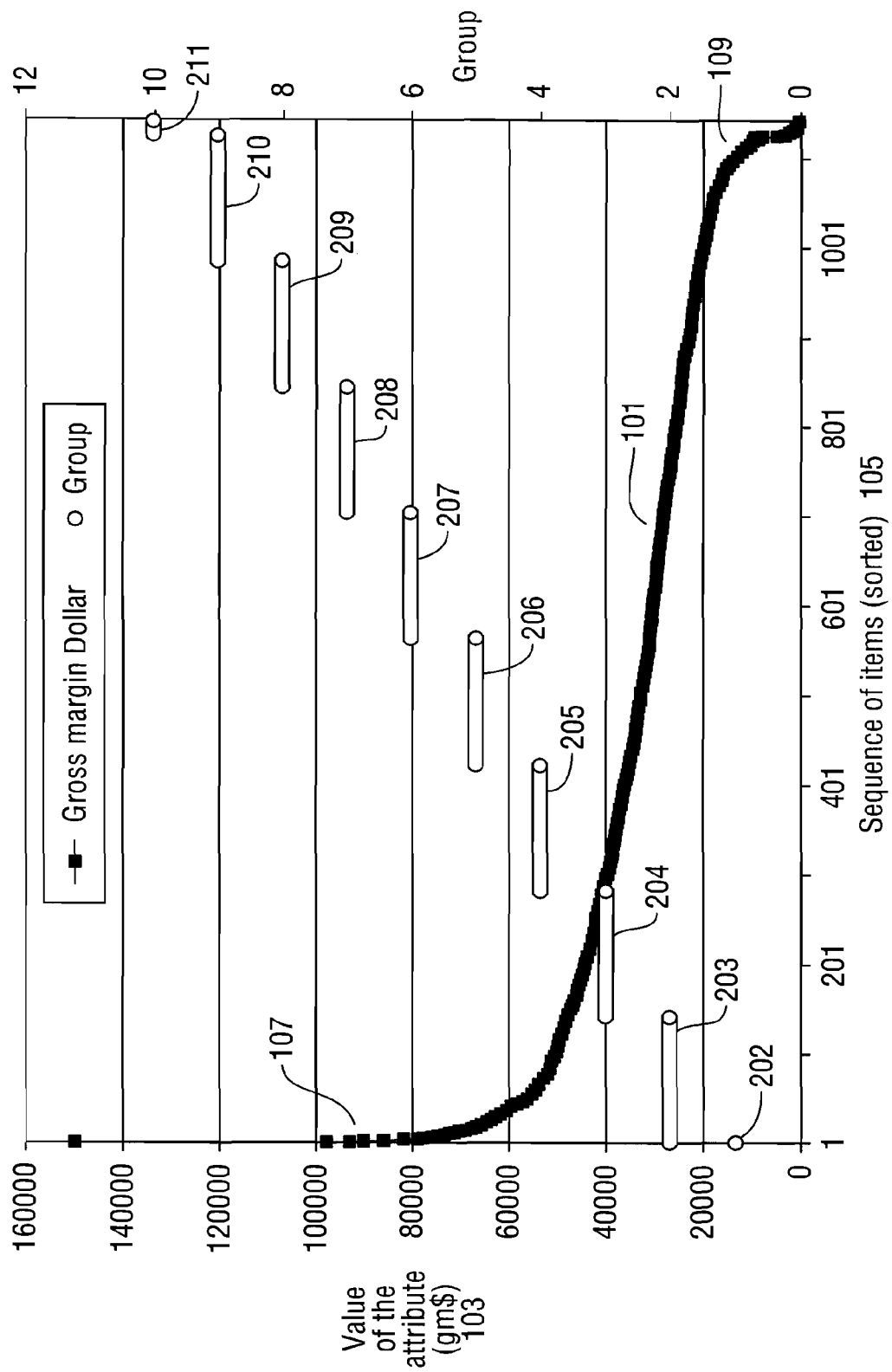
FIG. 2A is a graph illustrating the sorted distribution of an attribute value (gross margin dollars) among a plurality of items (retail stores) for grouping in accordance with an equal group-size strategy for partitioning a dataset.

FIG. 2A is a graph illustrating the sorted distribution of an attribute value (gross margin dollars) among a plurality of items (retail stores) for grouping in accordance with an equal group-size strategy for partitioning a dataset.

The tails can be identified as a percentage of the total number of items, as a percentage of the range of the dataset, or using a three-sigma technique. Analysis of these techniques showed that the tails can be best defined based on their range, using the following relations:

$$\begin{cases} \text{Upper tail} = \max(\text{all}) - c \cdot \dfrac{k}{1000} \\ \text{Lower tail} = \min(\text{all}) + c \cdot \dfrac{k}{1000} \end{cases} \quad \text{EQN 1}$$

where k is the number of desired partitions and c is an empirical factor (2<c<4 leads to satisfactory results).

After partitioning off the two tails into groups 1 and 2, represented by segments 202 and 211, the usual items can be simply clustered into groups of equal size, represented by segments 203 through 210. FIG. 2A shows that a fairly good partitioning is obtained using this strategy. This strategy however suffers from a potential shortcoming that that the groups may not cover similar ranges of the attribute. As shown in FIG. 2B, the middle groups, groups 3 through 8, tend to have narrower range (more similar items) than the others. Although this strategy may be sufficiently good for many practical cases, a more sophisticated strategy, discussed below, is developed for the case when both the size and the similarity of the items within groups are significantly important. This improved strategy, referred to as an equal curve-length strategy, is believed to resolve all the shortcomings described above.

The partitioning system described below provides a fast, simple and flexible method for partitioning of a dataset. More specifically, this method:

a. does not rely on any iteration or optimization, and hence requires little computational effort, b. is based on a straightforward algorithm that allows its implementation at different situations, and c. can be simply customized for a particular application, by changing a tuning parameter. This parameter can control the size and similarity of the items within each group.

Figure 3A:
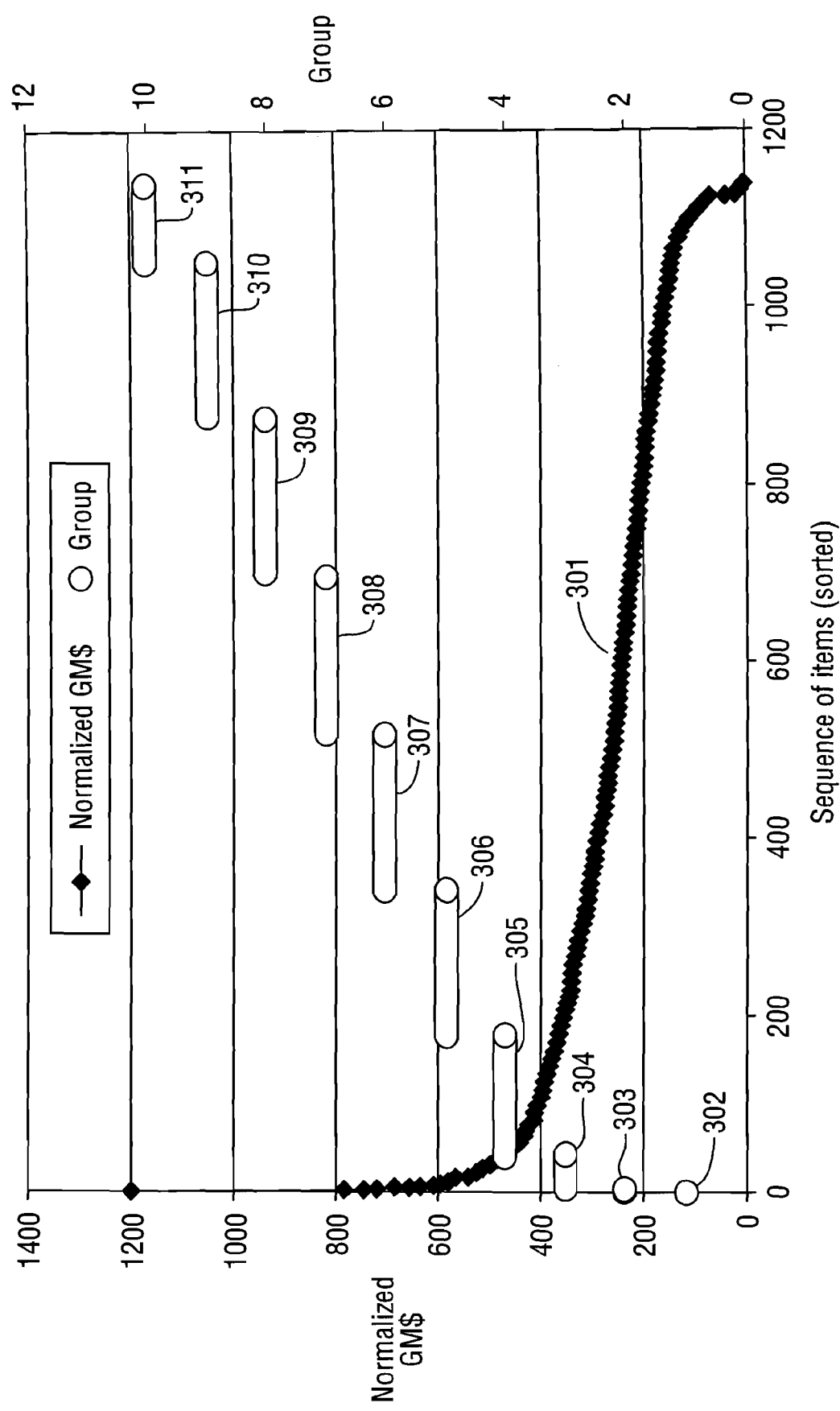
FIG. 3A is a graph illustrating the sorted distribution of an attribute value (gross margin dollars) among a plurality of items (retail stores) for grouping in accordance with an equal curve-length strategy for partitioning a dataset.
Figure 3B:
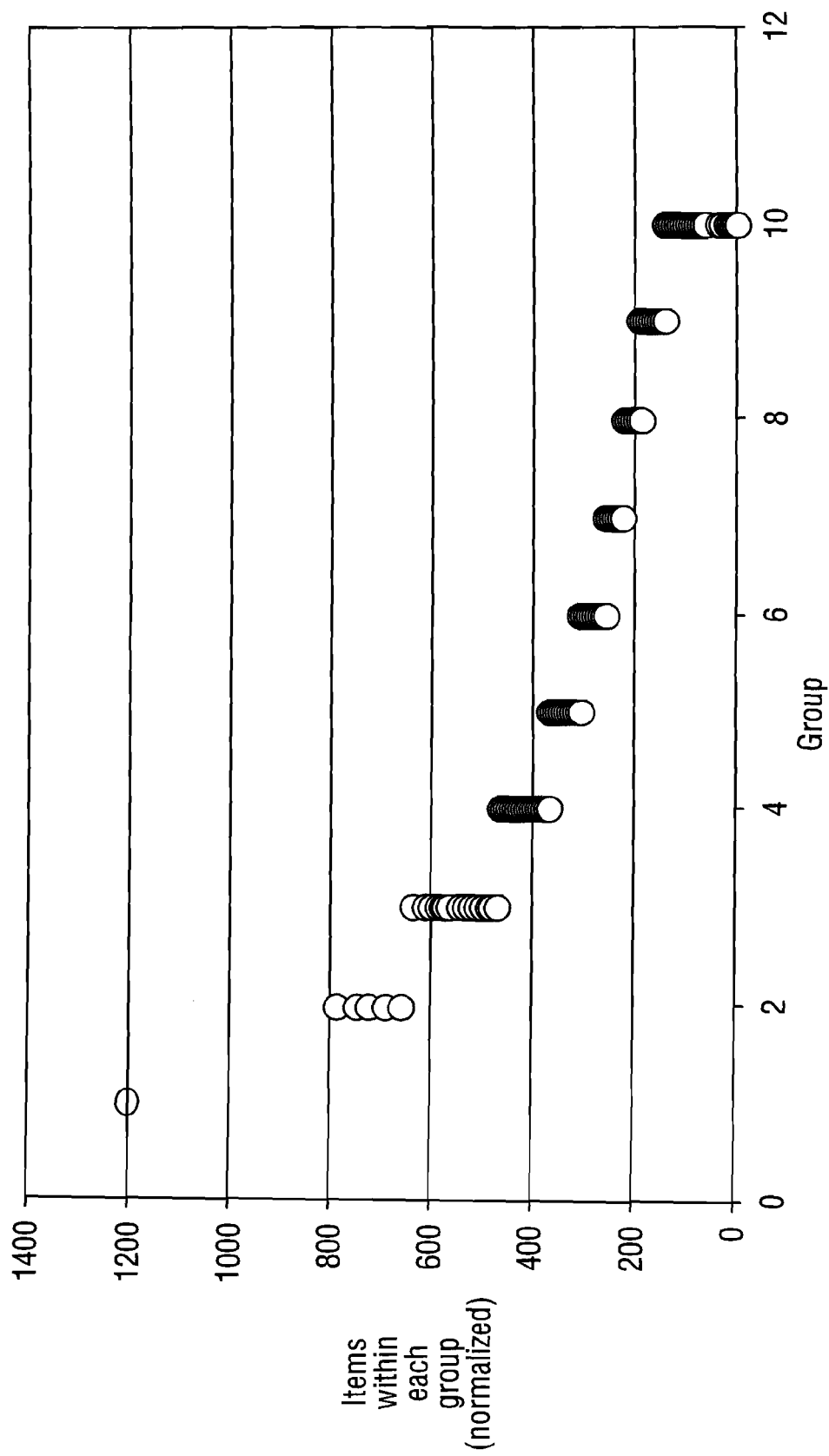
FIG. 3B is a histogram illustrating the grouping of items of FIG. 3A into groups with similar variation of item attribute value in accordance with an equal curve-length strategy for partitioning a dataset.

The equal curve-length strategy, illustrated in FIGS. 3A and 3B, attempts to balance both the range and the number of items in the groups. Therefore, it creates relatively large groups at the middle of the dataset, where small variation exists, and smaller groups at the two ends of the dataset, where unusual items with high variation exist.

In this method, the total length of distribution curve 301 is first calculated, and then the curve is divided into k equal pieces, where k is the number of the partitions. In FIG. 3A, the partitions are represented by the ten segments 302 through 311. This method accounts for both the range and the number of items within each group (count), since the length of the curve is the function of both factors. Assuming the distribution curve within each group as linear, its length is calculated as:

$$\text{Length} = f(\text{range}, \text{count}) \sim \sqrt{(\text{range})^2 + (\text{count})^2}. \quad \text{EQN 2}$$

The magnitude of the range variable in EQN. 2 depends on the scale of the attribute in hand, e.g., gross margin dollar. Consequently, the length function and the resulting partitions also depend on the scale of the attribute. This potential shortcoming is avoided by normalizing the attributes. Generally, good partitions are obtained when the overall range of the attribute is of the same size as the total number of the items to be grouped. This can be done using the following normalization formula:

$$attr_{norm} = K \cdot N \cdot \frac{attr - \min(\text{all})}{\max(\text{all}) - \min(\text{all})} \quad \text{EQN 3}$$

where attr is the attribute in hand, N is the total number of items to be partitioned and K is a constant parameter defining the relative scale of the attribute versus the number of items, which is unity (K=1) here.

The relative importance of range (the similarity of items within a group) and count (the size of the group) can be controlled using the tuning parameter K. This feature allows customization of the method for particular applications. Large values of K (K>>1) will result in groups of relatively equal range while a small K (1<K<0) tends to generate groups of relatively equal size. As an illustration, FIGS. 4 and 5 show the resulting partitions for K=0.1 and K=10, respectively.

Figure 4A:
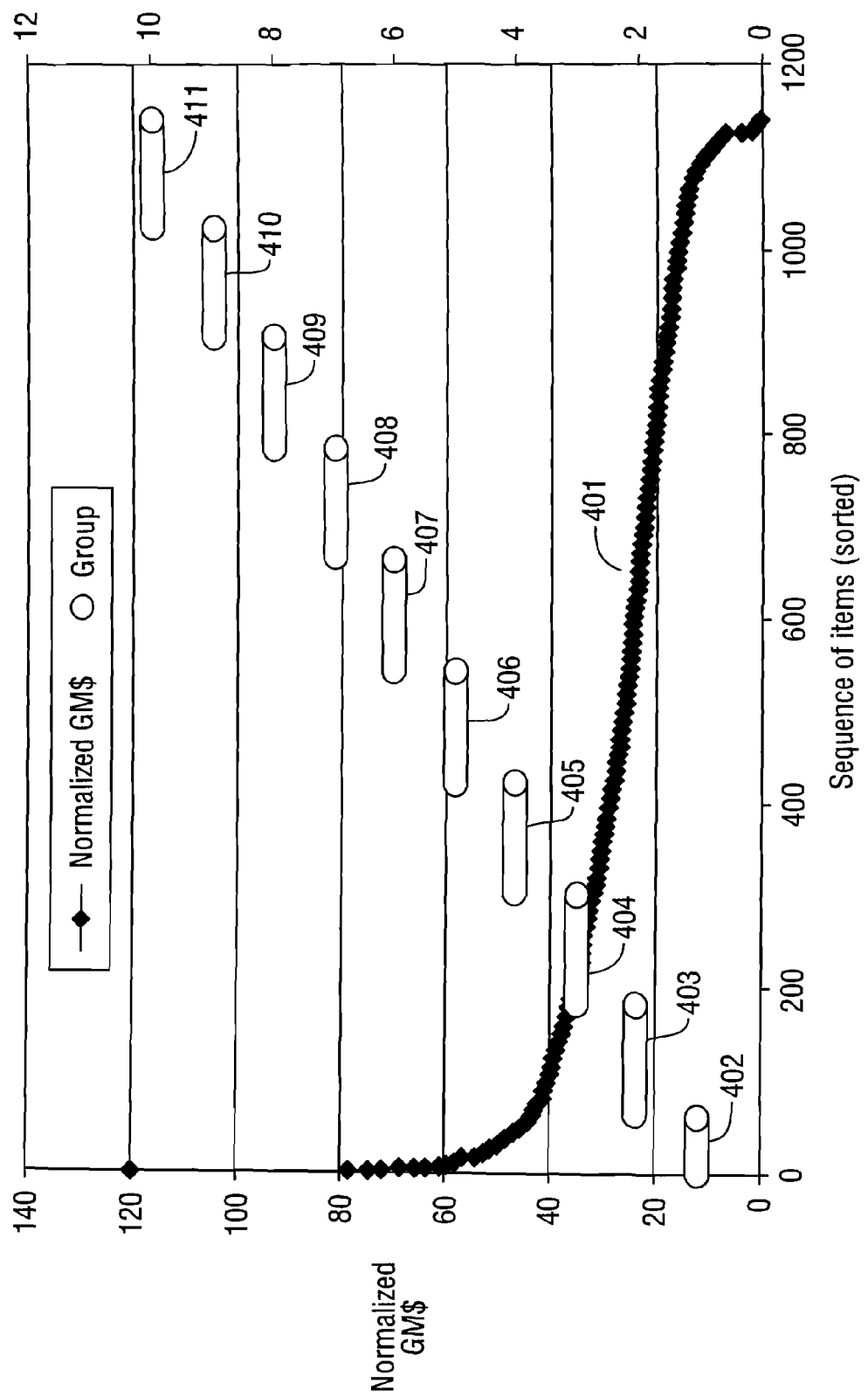
FIG. 4A is a graph illustrating the sorted distribution of an attribute value (gross margin dollars) among a plurality of items (retail stores) for grouping into groups of similar sizes in accordance with an equal curve-length strategy for partitioning a dataset.
Figure 4B:
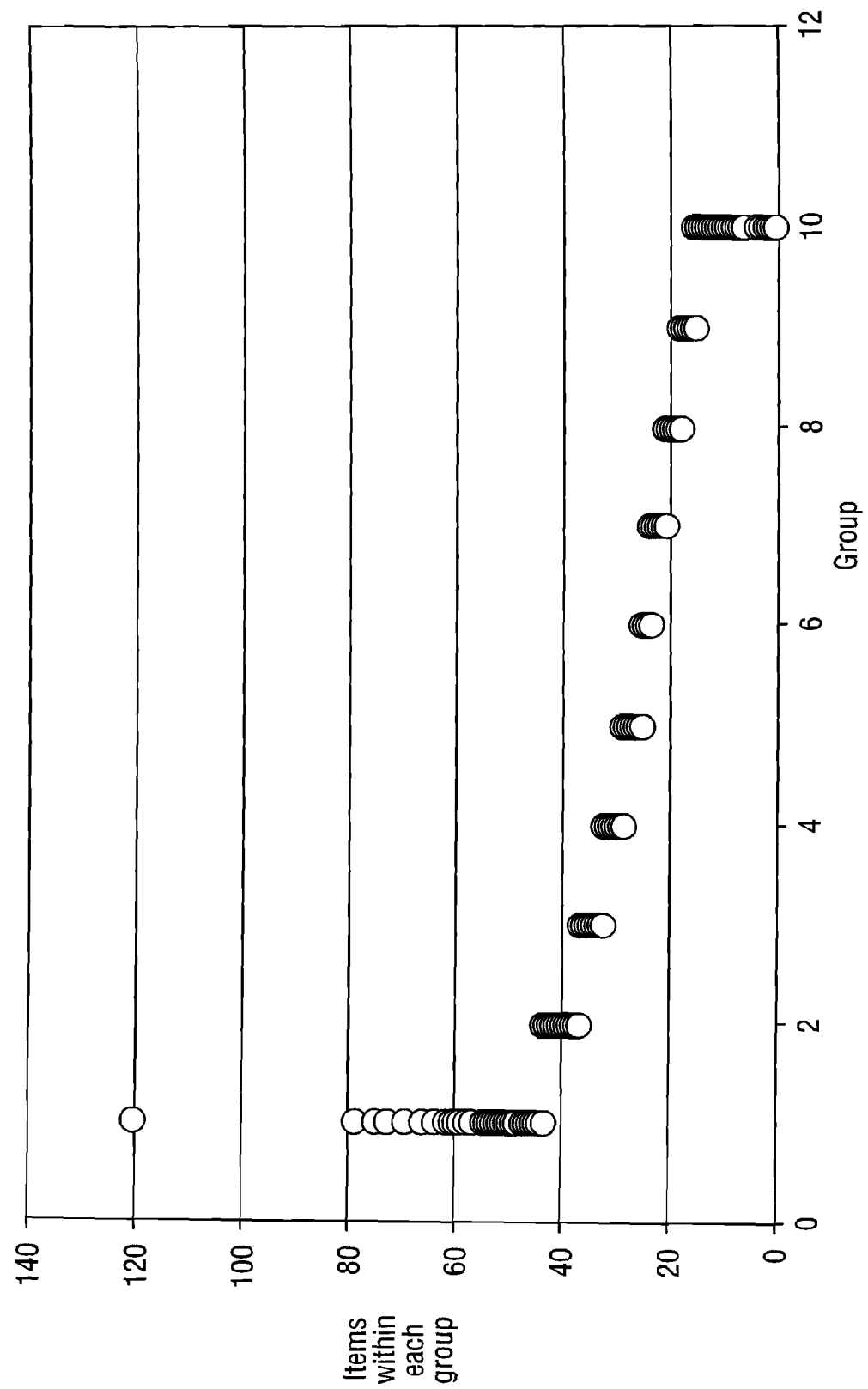
FIG. 4B is a histogram illustrating the grouping of items of FIG. 4A into a groups of similar sizes in accordance with an equal curve-length strategy for partitioning a dataset.

FIGS. 4A and 4B illustrate partitioning of the dataset using the equal curve-length strategy for a small value of the tuning parameter (K=0.1). Compared to FIGS. 3A and 3B, the scale of the attribute is smaller, leading to relatively equal groups, represented by segments 402 through 411 in FIG. 4A, but widely different ranges as illustrated in FIG. 4B. This approach is ideal for the applications where having similar group sizes has higher priority.

Figure 5A:
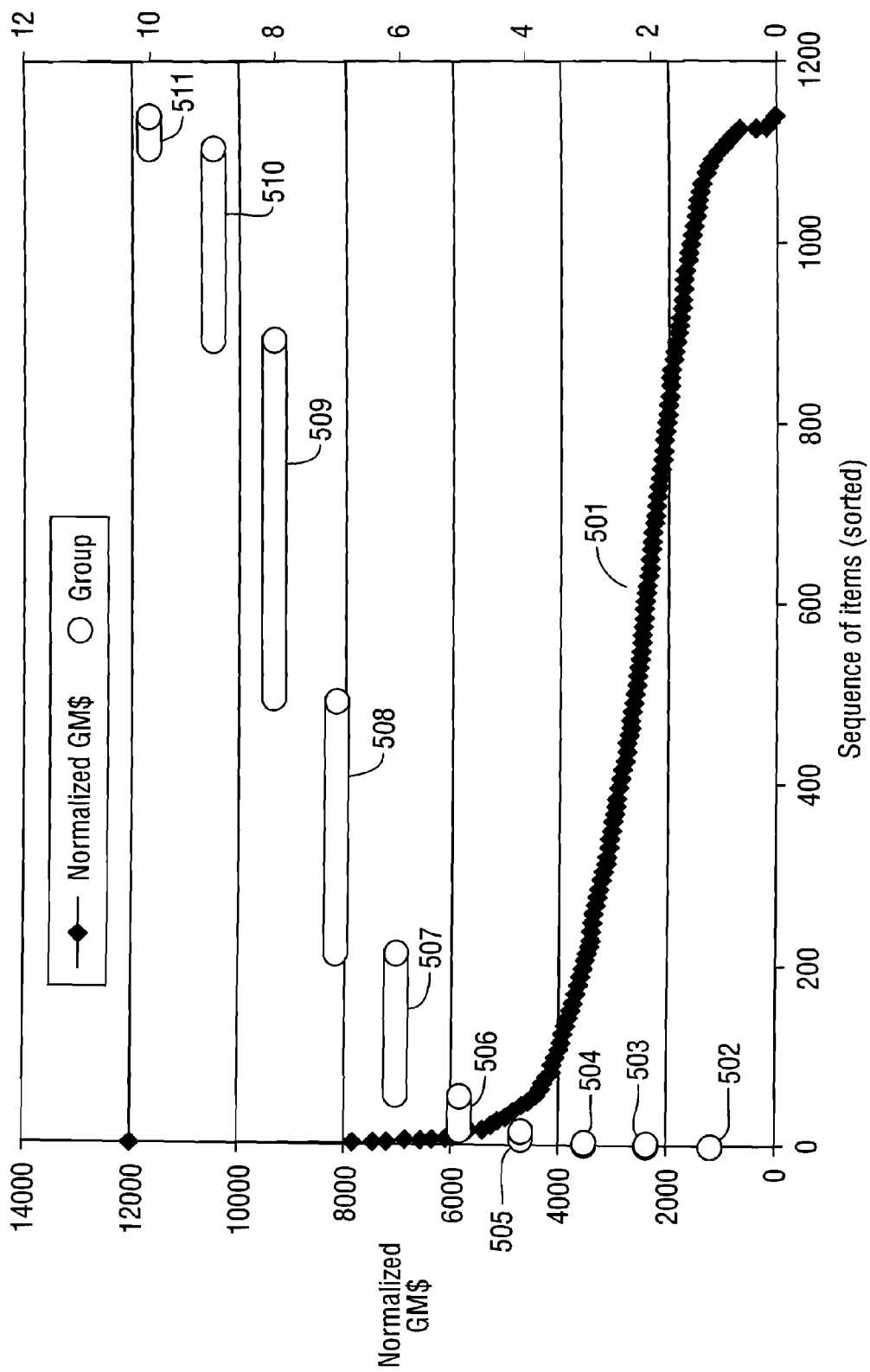
FIG. 5A is a graph illustrating the sorted distribution of an attribute value (gross margin dollars) among a plurality of items (retail stores) for grouping into a groups containing items having attributes with relatively equal ranges in accordance with an equal curve-length strategy for partitioning a dataset.
Figure 5B:
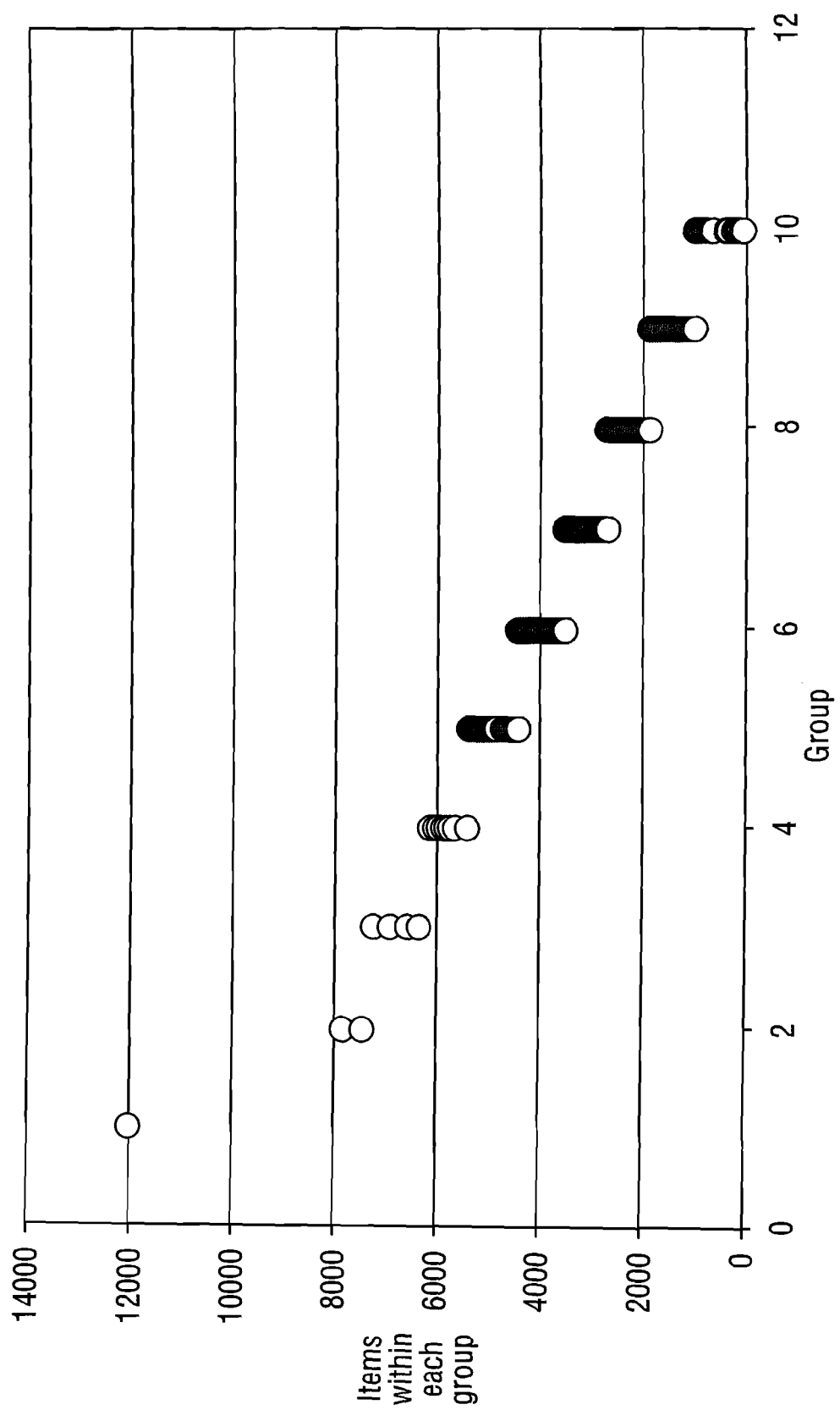
FIG. 5B is a histogram illustrating the grouping of items of FIG. 5A into groups containing items having attributes with relatively equal ranges in accordance with an equal curve-length strategy for partitioning a dataset.

FIGS. 5A and 5B illustrate partitioning of the dataset using the equal curve-length strategy for a large value of the tuning parameter (K=10). Compared to FIGS. 3A, 3B, 4A and 4B, the scale of the attribute is larger, leading to relatively equal ranges as illustrated in FIG. 5B, but widely different group sizes, represented by segments 502 through 511 in FIG. 5A. This approach is ideal for the applications where the similarity of the items within groups has higher priority.

As an optional step, the partitioning method can be further improved by blending equal curve-length and the largest gap strategies described above. In this approach the dataset is first partitioned into k−1 preliminary groups using the equal curve-length strategy. Then the final partitions are defined at the largest gap within each preliminary group. This partitioning strategy takes into account the number of items per group, the range or similarity of the items within the group, as well as the gaps in the dataset, and hence produces the best partitions among the methods described above.

Figure 6:
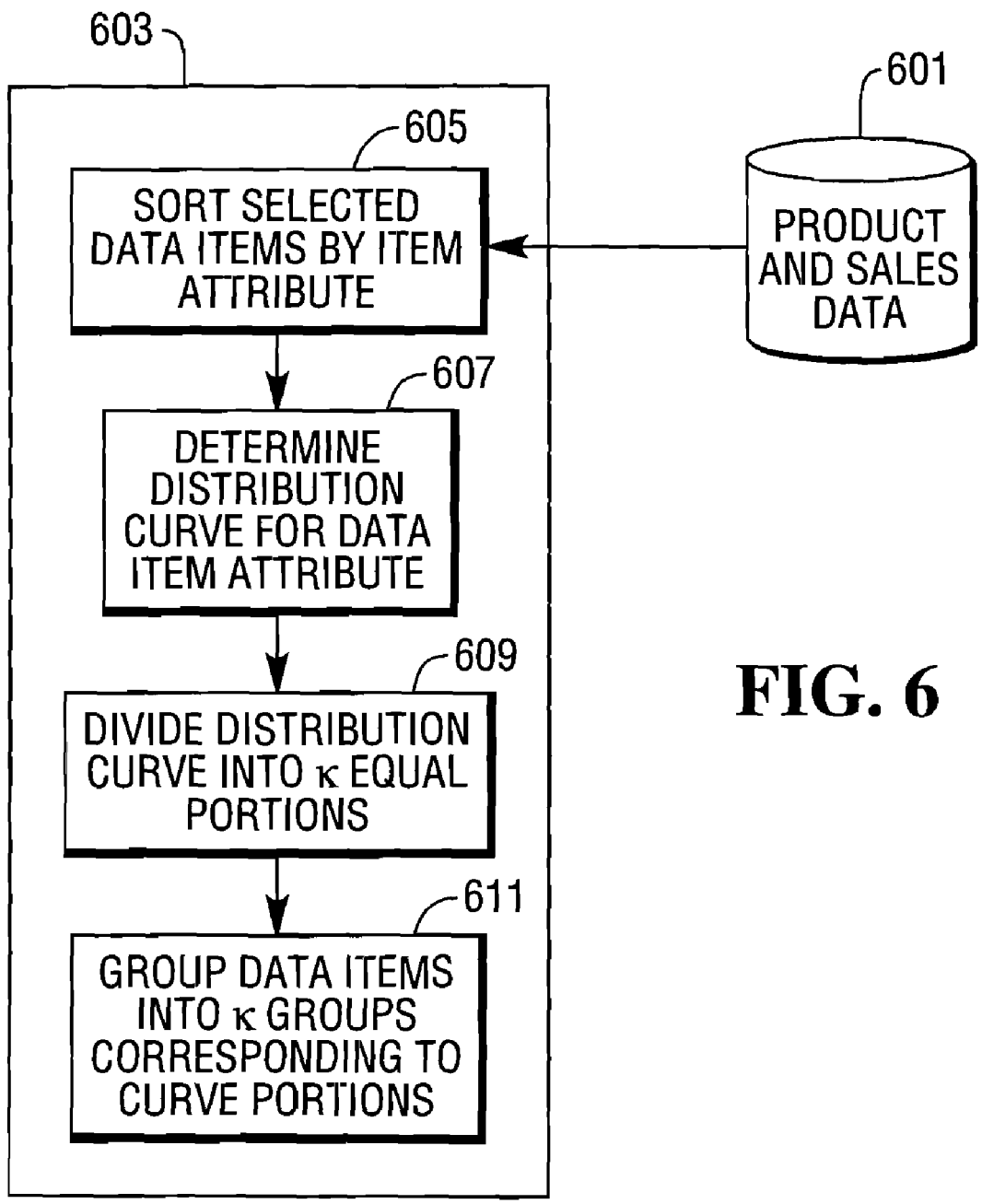
FIG. 6 provides a simple flow chart illustrating the process of partitioning a dataset into several groups utilizing an equal curve-length strategy in accordance with the present invention.

FIG. 6 provides a simple flow chart illustrating the process of partitioning a dataset into several groups utilizing the equal curve-length strategy. The process, executed within computer system 603, retrieves product and sales data from storage device 601. In step 605, data items selected and sorted by a data attribute of interest to a user. In step 607, a distribution curve is determined for the selected data and data attribute, such as distribution curve 301 illustrated in FIG. 3.

The total length of the distribution curve is first calculated, for example through use of EQN. 2 provided above, and then the curve is divided into k equal pieces, where k is the number of the partitions, as shown in step 609. Finally, in step 611, the selected data is partitioned into k groups corresponding to the curve portions determined in step 609.

CONCLUSION

The Figures and description of the invention provided above describe a partitioning system that provides a fast, simple and flexible method for partitioning of a dataset. More specifically, the described method does not rely on any iteration or optimization, and hence requires little computational effort; is based on a straightforward algorithm that allows its implementation at different situations; and can be simply customized for a particular application, by changing a tuning parameter.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for partitioning a dataset, the method comprising the steps of:
    maintaining the dataset in an electronic database, the dataset including at least ten data items, the data items containing a first attribute, the first attribute having a range of attribute values;
    sorting the dataset in an ascending or descending sequence by the range of attribute values present in the first attribute;
    generating a distribution curve for the dataset by plotting the data items in the dataset in ascending or descending sort sequence;
    calculating a total length of said distribution curve, the length of the distribution curve being estimated through use of the equation:

$$\text{Length} = f(\text{range}, \text{count}) \approx \sqrt{(\text{range})^2 + (\text{count})^2},$$

where count represents the number of data items within the dataset, and range represents the range of attribute values;
    dividing said distribution curve, using the total length of the distribution curve, into a plurality of equal length curve segments; and
    grouping said data items into a plurality of partitions, each partition comprising data items corresponding to one of said curve segments.

2. The computer-implemented method for partitioning a dataset in accordance with claim 1, wherein:
    said step of dividing said distribution curve into a plurality of equal curve segments comprises the step of dividing said distribution curve into k equal pieces, where k equals a number of desired partitions; and
    said step of grouping said data items into a plurality of partitions comprises grouping said data items into k partitions, each one of said k partitions corresponding to one of said k curve segments.

3. The computer-implemented method for partitioning a dataset in accordance with claim 2, further comprising the step of:
    normalizing the values of said attribute prior to determining said distribution curve.

4. A system for partitioning a dataset, comprising:
    an electronic database containing the dataset, the dataset including at least ten data items, the data items containing a first attribute, the first attribute having a range of attribute values;
    sorting the dataset in an ascending or descending sequence by the range of attribute values present in the first attribute;
    generating a distribution curve for the dataset by plotting the data items in the dataset in ascending or descending sort sequence;
    calculating a total length of said distribution curve, the length of the distribution curve being estimated through use of the equation:

$$\text{Length} = f(\text{range}, \text{count}) \approx \sqrt{(\text{range})^2 + (\text{count})^2},$$

where count represents the number of data items within the dataset, and range represents the range of attribute values;
    dividing said distribution curve, using the total length of the distribution curve, into a plurality of equal length curve segments; and
    grouping said data items into a plurality of partitions, each partition comprising data items corresponding to one of said curve segments.

5. The system in accordance with claim 4, wherein:
    dividing said distribution curve into a plurality of equal curve segments comprises the dividing said distribution curve into k equal pieces, where k equals a number of desired partitions; and
    grouping said data items into a plurality of partitions comprises grouping said data items into k partitions, each one of said k partitions corresponding to one of said k curve segments.

6. The system in accordance with claim 5, wherein:
    the values of said attribute are normalized prior to determining said distribution curve.

* * * * *